(12) United States Patent
Kirkpatrick (10) Patent No.: US 11,736,848 B2
(45) Date of Patent: Aug. 22, 2023

(54) THREE-DIMENSIONAL EARPIECE PRODUCTION SYSTEM

(71) Applicant: Decibullz LLC, Fort Collins, CO (US)

(72) Inventor: Kyle J Kirkpatrick, Fort Collins, CO (US)

(73) Assignee: Decibullz LLC, Fort Collins, CO (US)

( * ) Notice: Subject to any disclaimer, the term of this patent is extended or adjusted under 35 U.S.C. 154(b) by 80 days.

(21) Appl. No.: 17/440,484

(22) PCT Filed: Mar. 19, 2020

(86) PCT No.: PCT/US2020/023527
§ 371 (c)(1),
(2) Date: Sep. 17, 2021

(87) PCT Pub. No.: WO2020/191138
PCT Pub. Date: Sep. 24, 2020

(65) Prior Publication Data
US 2022/0159362 A1    May 19, 2022

Related U.S. Application Data

(60) Provisional application No. 62/821,351, filed on Mar. 20, 2019.

(51) Int. Cl.
*H04R 25/00* (2006.01)
*H04R 1/10* (2006.01)
*B33Y 10/00* (2015.01)

(52) U.S. Cl.
CPC ............ *H04R 1/1016* (2013.01); *B33Y 10/00* (2014.12); *H04R 1/1058* (2013.01); *H04R 2201/105* (2013.01)

(58) Field of Classification Search
CPC .... H04R 1/105; H04R 1/1066; H04R 1/1016; H04R 1/1058; H04R 9/06
See application file for complete search history.

(56) References Cited

U.S. PATENT DOCUMENTS

| | | | |
|---|---|---|---|
| 2004/0107080 A1 | 6/2004 | Deichmann et al. | |
| 2013/0216086 A1* | 8/2013 | Kirkpatrick ......... | H04R 1/1016 381/380 |
| 2015/0382123 A1* | 12/2015 | Jobani ................ | H04R 1/1016 700/98 |
| 2018/0213315 A1 | 7/2018 | Kirkpatrick | |

FOREIGN PATENT DOCUMENTS

WO    WO 2015/108717 A1    7/2015

OTHER PUBLICATIONS

PCT International Patent Application No. PCT/US20/23527, International Search Report and Written Opinion of the International Searching Authority dated Jun. 19, 2020, 13 pages.
European Patent Application No. 20774422.8, Supplementary European Search Report dated Nov. 11, 2022, 9 pages.

* cited by examiner

*Primary Examiner* — Amir H Etesam
(74) *Attorney, Agent, or Firm* — Craig R. Miles; CR MILES P.C.

(57) ABSTRACT

A three-dimensional earpiece production system for additive manufacturing of a three-dimensional earpieces based on scanned images of an ear which conformably engage the outer ear of a wearer.

23 Claims, 10 Drawing Sheets

THREE-DIMENSIONAL EARPIECE PRODUCTION SYSTEM

This application is the United States National Stage of International Patent Cooperation Treaty Patent Application No. PCT/US20/23527, filed Mar. 19, 2020, which claims the benefit of U.S. Provisional Patent Application No. 62/821,351, filed Mar. 20, 2019, each hereby incorporated by reference herein.

I. TECHNICAL FIELD

A three-dimensional earpiece production system for additive manufacturing of a three-dimensional earpieces based on scanned images of an ear which conformably engage the outer ear of a wearer.

III. MODE(S) FOR CARRYING OUT THE INVENTION

Figure 25:
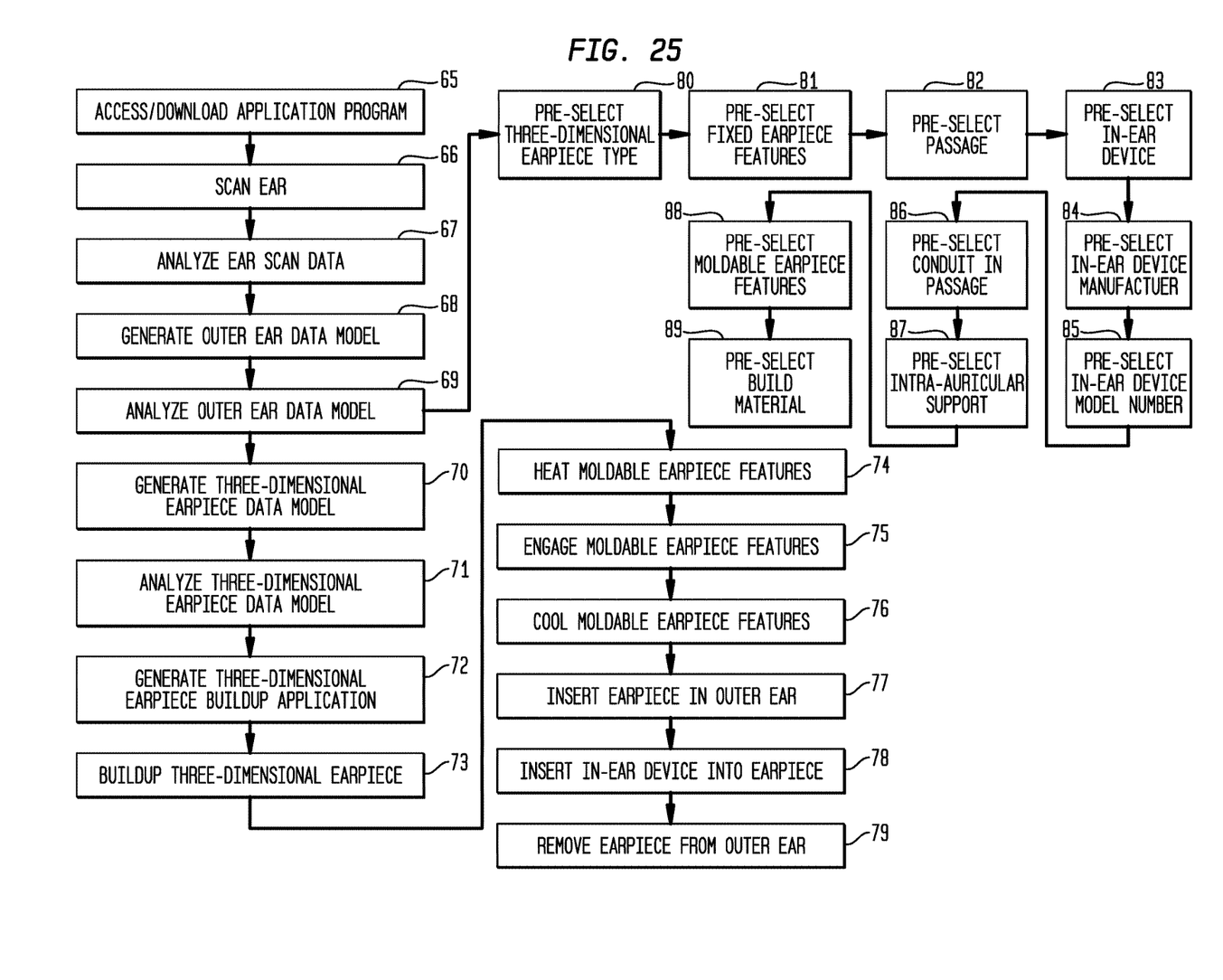
FIG. 25 is a block flow diagram of a method of making and using embodiments of the earpieces produced in the system of FIG. 1.

The System. Generally, referring to FIGS. 1 through 25, a three-dimensional earpiece production system (1) (also referred to as the "system (1)") can be distributed on one or more server computers (2)(individually or collectively referred to as a "server (1)") operably coupled to one or more client computing devices (3) by a public network (4), such as the Internet (5), a cellular-based wireless network(s) (6), or a local network (7) (individually or collectively the "network"). The server (2) includes a server processor (8) communicatively coupled to a server non-transitory computer readable media (9) (or memory element) containing a three-dimensional earpiece production application (10) (also referred to as the "application program (10)"). The network (4) supports the application program (10) which can be accessed by browser based on-line processing or downloadable by one or more client computing device (3)(FIG. 25, Block 65) to enable client computing devices (3) to establish off-line wired or wireless connection with an ear scanner (11) operable to scan an ear (12) and provide ear scan data (13)(FIG. 25, Block 66). The application program (10) can be executed to receive the ear scan data (13) from the ear scanner (11), or in particular embodiments from the client computing device (3), operating as an ear scanner (11). The server (2) or the client computing device (3) can apply the application program (10) to analyze the ear scan data (13)(FIG. 25, Block 67) or function to generate an outer ear data model (14)(FIG. 25, Block 68) of the outer ear (15), or analyze the ear scan data (13) or analyze the outer ear data model (14) (FIG. 25, Block 69) to generate a three-dimensional earpiece data model (16) (FIG. 25, Block 70) based on the ear scan data (13). In particular embodiments, the ear scanner (11) can generate the outer ear data model (14) or the three-dimensional earpiece data model (16) based on the ear scan data (13). The application program (10) can further function to analyze the three-dimensional earpiece data model (16)(FIG. 25, Block 71) to generate a three-dimensional earpiece buildup application (17)(FIG. 25, Block 72) executable to operate a material deposition apparatus (18), whether communicatively coupled to the client computing device (3) or the server (2) to buildup a three-dimensional earpiece (19)(FIG. 25, Block 73) based upon the three-dimensional earpiece data model (16).

The Client Computing Device. Now, referring primarily to FIG. 1, the client computing device (3) can include as illustrative examples: desktop computer devices or mobile computer devices such as personal computers, slate computers, tablet or pad computers, cellular telephones, personal digital assistants, smartphones, programmable consumer electronics, or combinations thereof. The client computing device (3) can include a client computer processor (20) communicatively coupled to a non-transitory client computer readable media (21) which can contain or access in whole or in part the program application (10).

Figure 1:
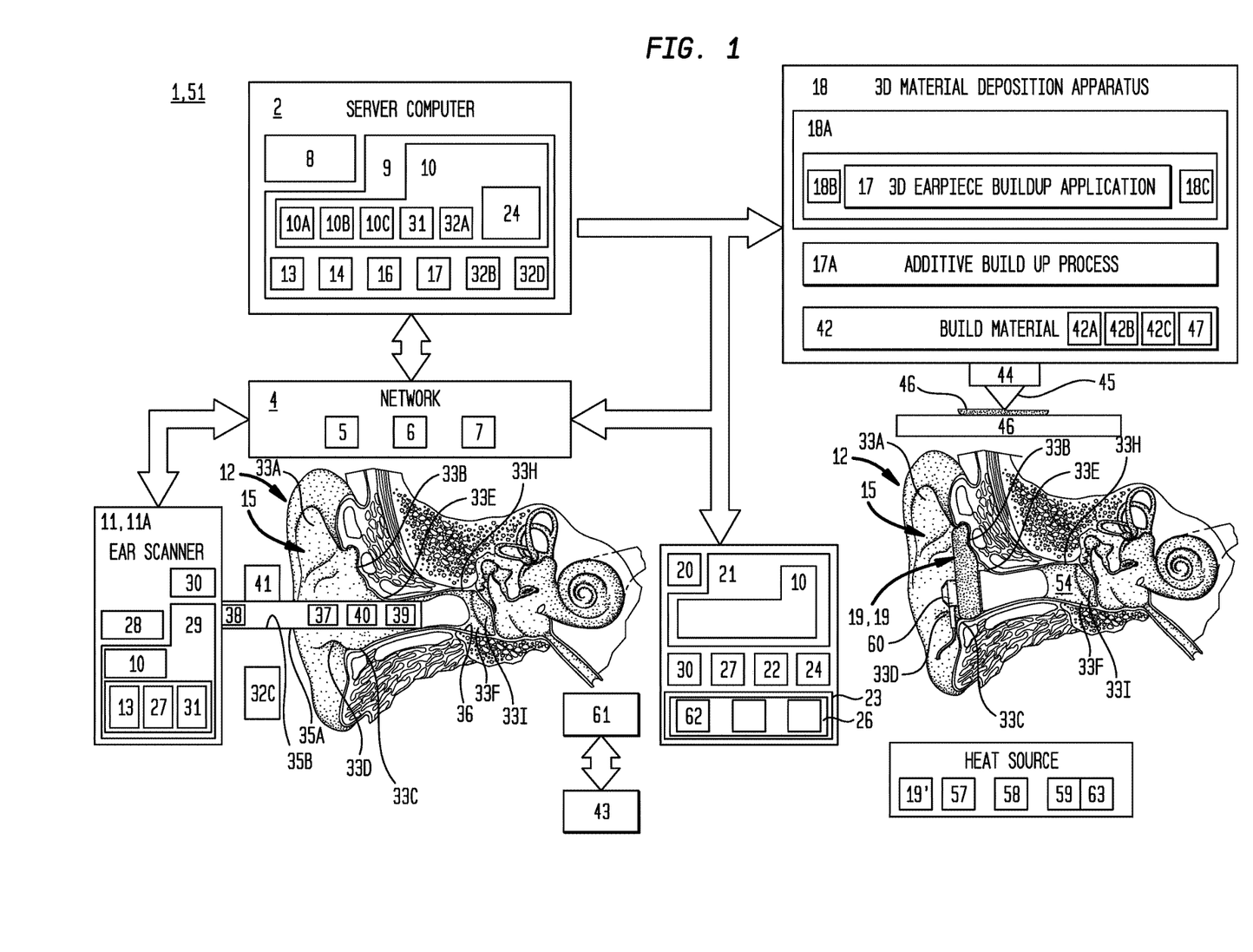
FIG. 1 is a block diagram of a three-dimensional earpiece production system include illustrative computer means, network means and computer-readable media which provides computer-executable instructions to produce embodiments of a three-dimensional earpiece.
Figure 2:
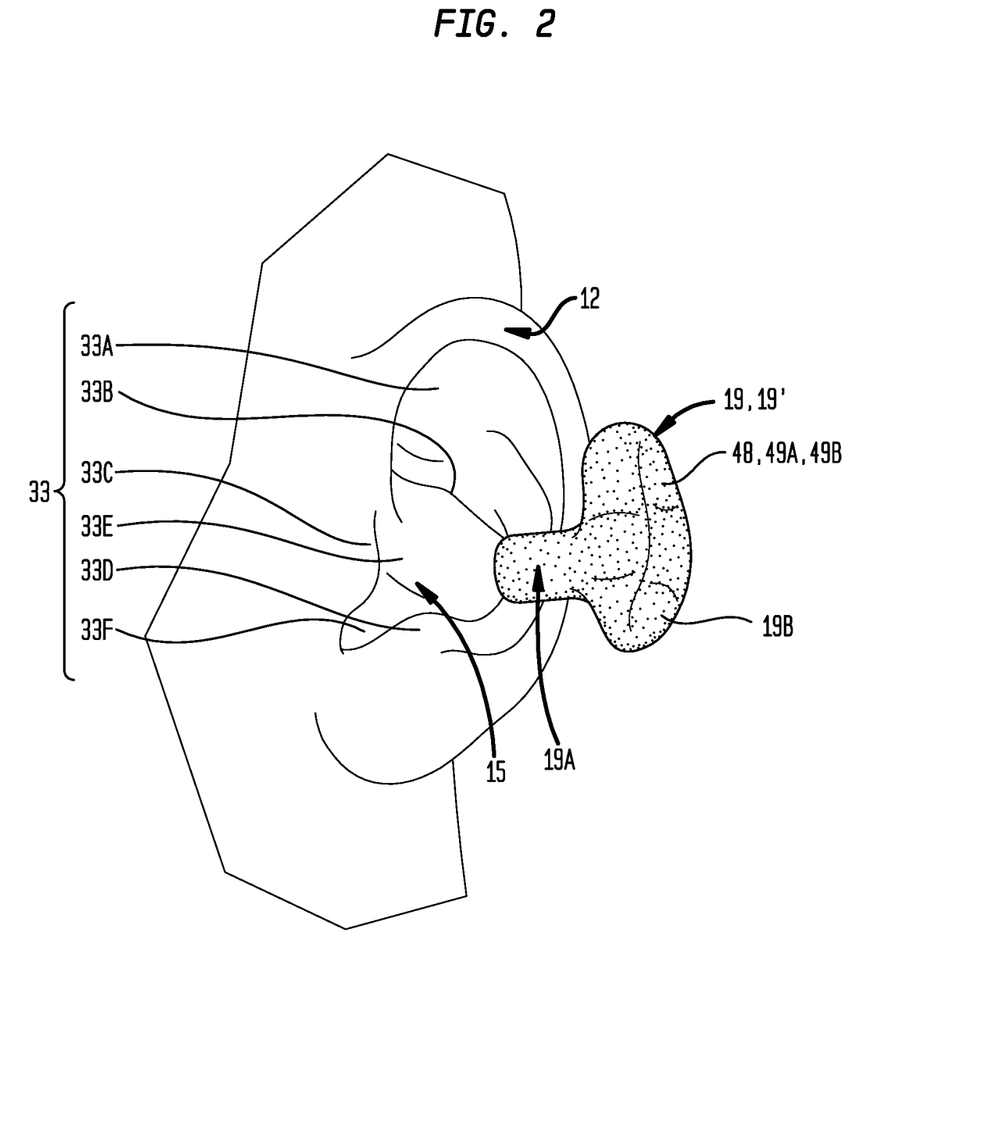
FIG. 2 is an illustration of a method of using an embodiment of a three-dimensional earpiece produced in the system of FIG. 1.
Figures 3, 4, 5:
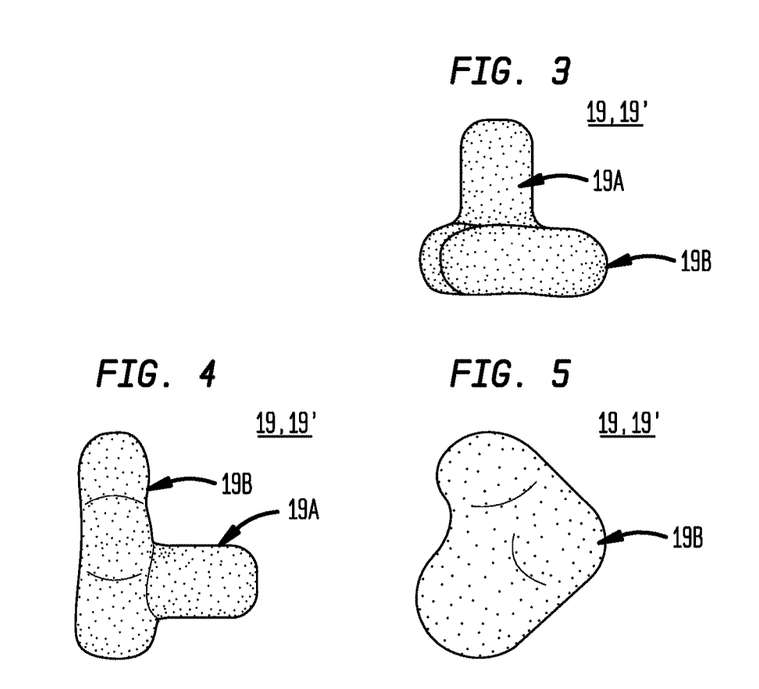
FIG. 3 is first end view of an embodiment of a three-dimensional earpiece.
FIG. 4 is first side view of an embodiment of a three-dimensional earpiece.
FIG. 5 is first elevation view of an embodiment of a three-dimensional earpiece.
Figure 6:
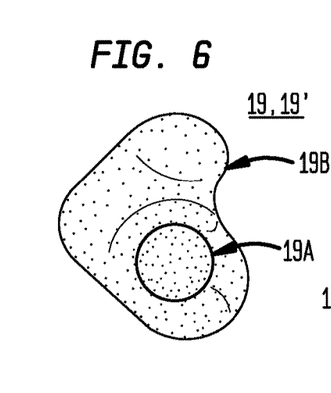
FIG. 6 is second elevation view of an embodiment of a three-dimensional earpiece.
Figure 7:
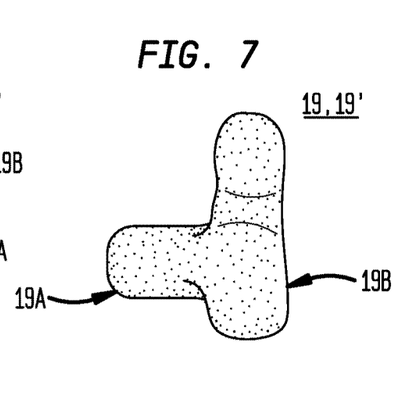
FIG. 7 is a second side view of an embodiment of a three-dimensional earpiece.
Figure 8:
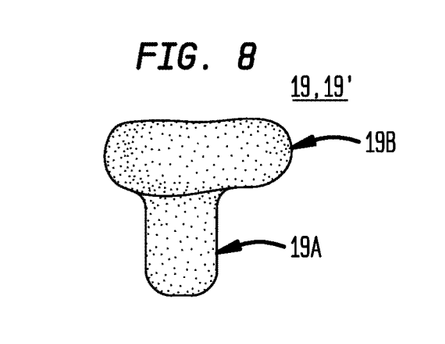
FIG. 8 is a second end view of an embodiment of a three-dimensional earpiece.
Figure 9:
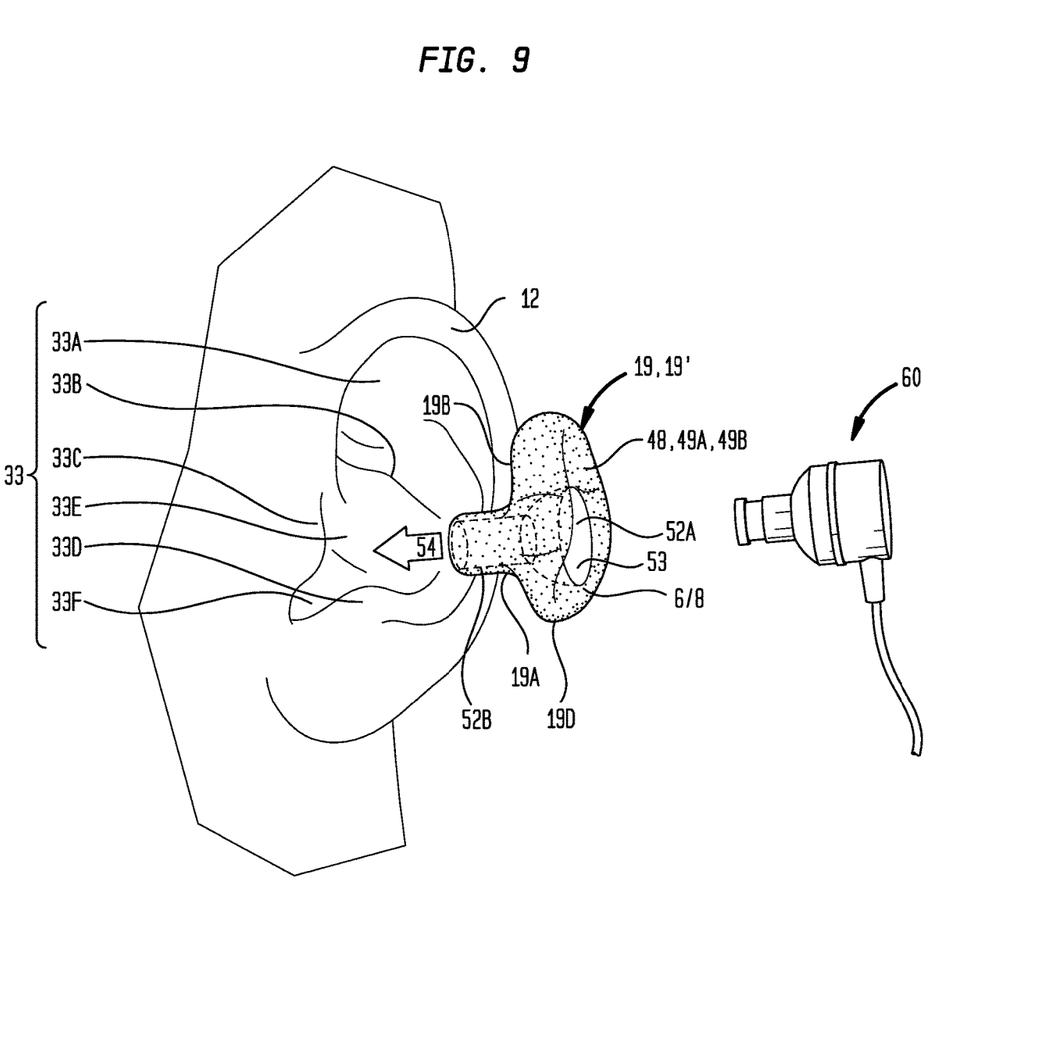
FIG. 9 is an illustration of a method of using an embodiment of a three-dimensional earpiece including a passage to receive an in-ear device and through which sound can be transmitted to the tympanic membrane of the ear produced in the system of FIG. 1.
Figures 10, 11, 12, 13, 15:
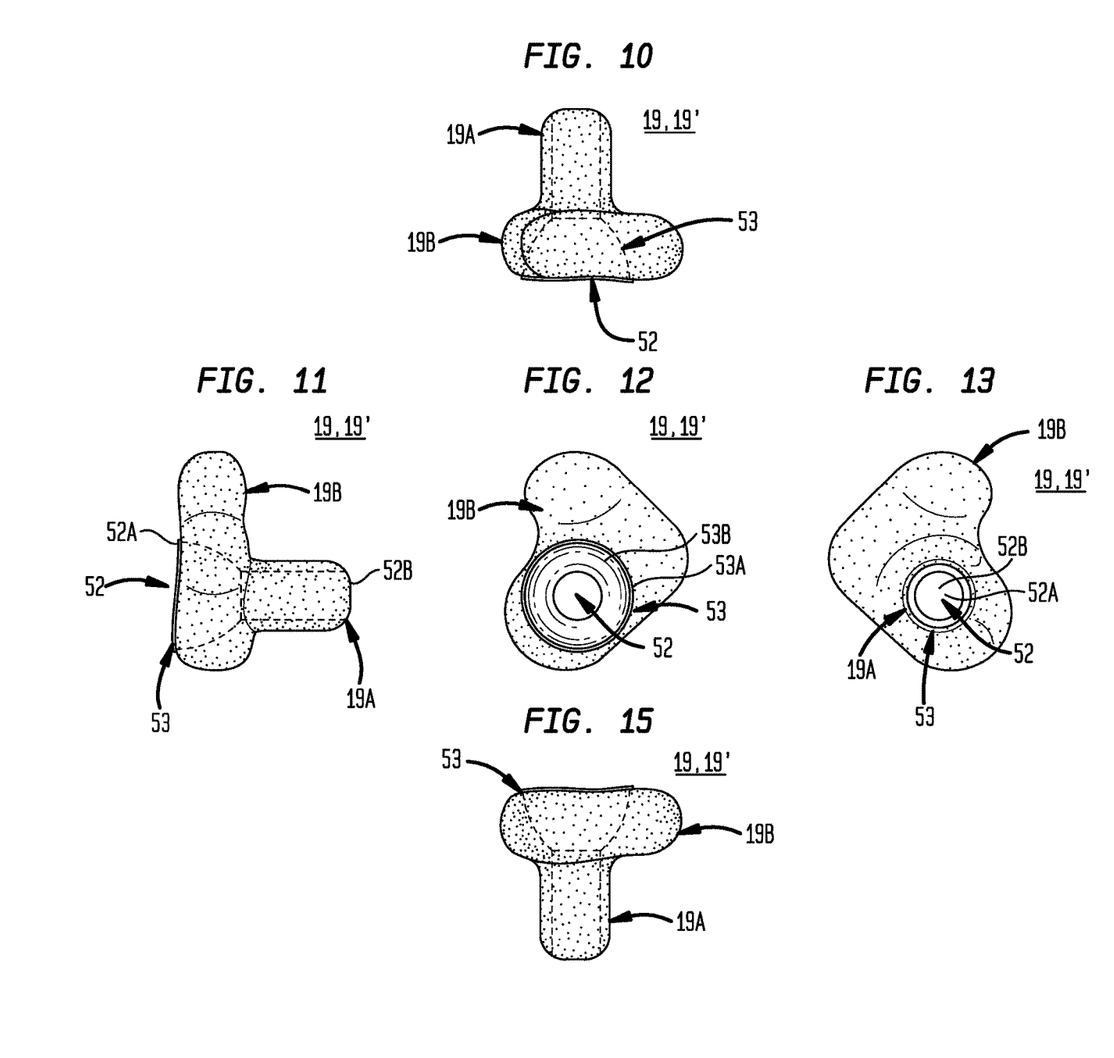
FIG. 10 is first end view of an embodiment of a three-dimensional earpiece including a passage to receive an in-ear device.
FIG. 11 is first side view of an embodiment of a three-dimensional earpiece including the passage to receive an in-ear device.
FIG. 12 is first elevation view of an embodiment of a three-dimensional earpiece including the passage.
FIG. 13 is second elevation view of an embodiment of a three-dimensional earpiece including the passage to receive an in-ear device.
FIG. 15 is a second end view of an embodiment of a three-dimensional earpiece including the passage to receive an in-ear device.
Figure 14:
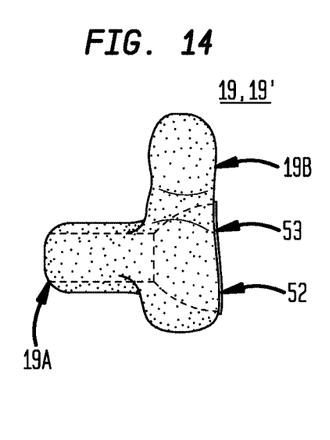
FIG. 14 is a second side view of an embodiment of a three-dimensional earpiece including the passage to receive an in-ear device.
Figure 16:
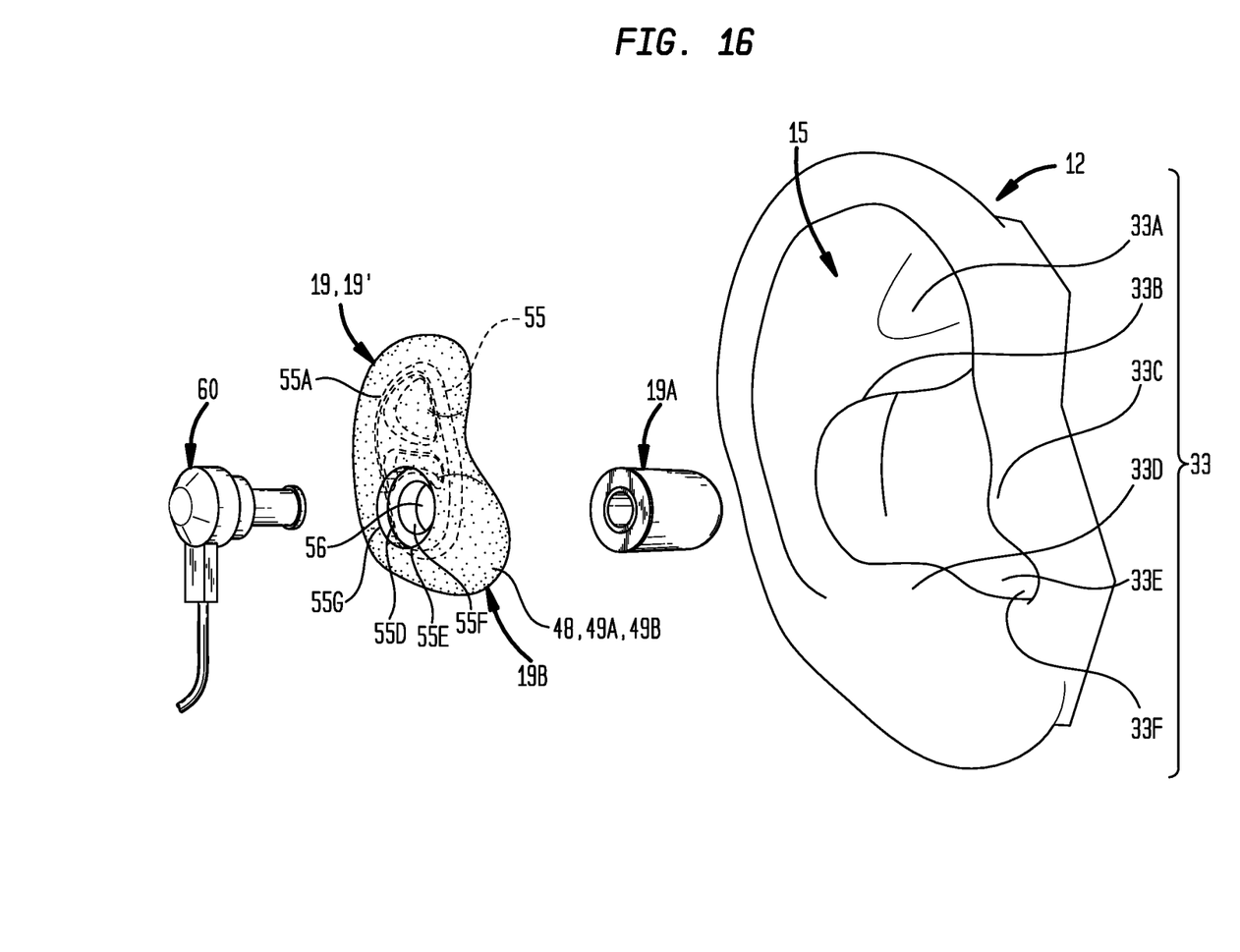
FIG. 16 is an illustration of a method of using an embodiment of a three-dimensional earpiece including an intra-auricular support which can include an ear canal earpiece or include a passage to receive an in-ear device and through which sound can be transmitted to the tympanic membrane of the ear produced in the system of FIG. 1.
Figure 17:
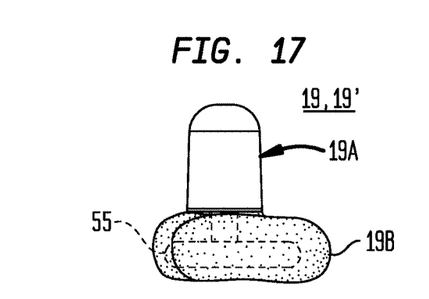
FIG. 17 is first end view of an embodiment of a three-dimensional earpiece including an intra-auricular support.
Figure 18:
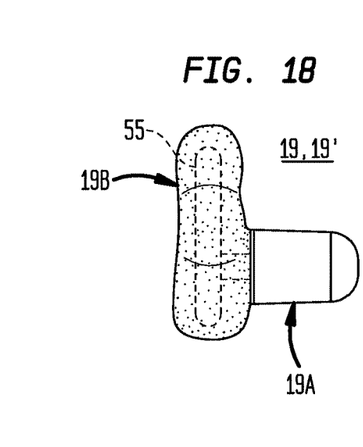
FIG. 18 is first side view of an embodiment of a three-dimensional earpiece including an intra-auricular support.
Figure 19:
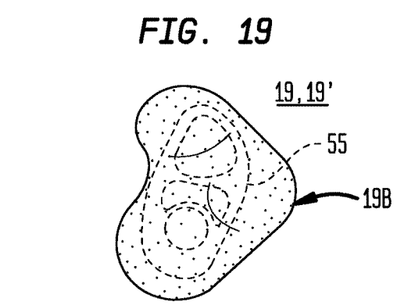
FIG. 19 is first elevation view of an embodiment of a three-dimensional earpiece including an intra-auricular support.
Figure 20:
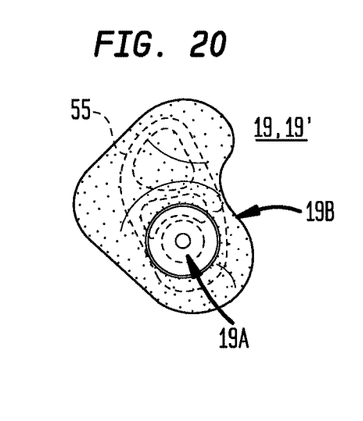
FIG. 20 is second elevation view of an embodiment of a three-dimensional earpiece including an intra-auricular support.
Figure 21:
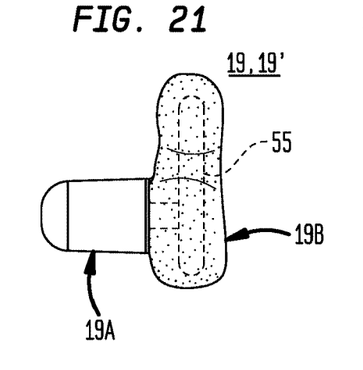
FIG. 21 is a second side view of an embodiment of a three-dimensional earpiece including an intra-auricular support.
Figure 22:
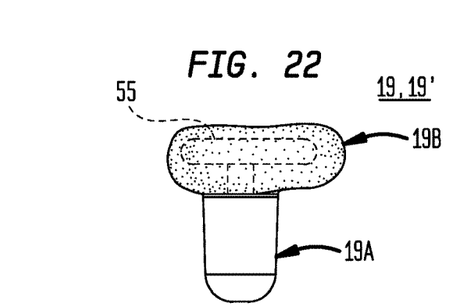
FIG. 22 is a second end view of an embodiment of a three-dimensional earpiece including an intra-auricular support.

In general, each of the one or more client devices (3) can include an Internet browser (22)(also referred to as a "browser (22)") such as Microsoft's INTERNET EXPLORER®, GOOGLE CHROME®, MOZILLA®, FIREFOX®, or the like, which functions to download and render multimedia content that is formatted in "hypertext markup language" (HTML). In this environment, the server (2) might be programmed to implement the most significant portions of a user interface (23). As to these embodiments, the application program (10) which in part implements the user interface (23) can be resident in the server (2) and the one or more client devices (3) can use the browser (22) to simply display downloaded content (24) and to relay user inputs (25) back to the server (2). The server (2) would respond by formatting new screen displays (26) and downloading them for display on a display surface of the client devices (3). In other embodiments, server (2) can be used primarily as sources of downloaded content (24)(such as images and data), with primary responsibility for implementing the user interface (23) being placed upon each of the one or more client devices (3). As to these embodiments, each of the one or more client devices (3) can run the application program (10) implementing the user interface (23) to retrieve downloaded content (24) from the server (2) or a greater number of servers (2) in a common format.

The Ear Scanner. Again, referring primarily to FIG. 1, the ear scanner (11) can comprise any of a wide variety of devices capable acquiring ear scan data (13) which can be converted by the application program (10) into an outer ear data model (14) from which the application program (10) can construct a corresponding three-dimensional earpiece data model (16). In particular embodiments, the client computer (3) and the ear scanner (11) can comprise the same device or a unitary device. As an illustrative example. the ear scanner (11) and the client computing device (3) can comprise one cellular or mobile telephone (3A) having access to the application program (10) and capable of capturing ear images (27). The ear scanner (11) can include an ear scanner processor (28) communicatively coupled to an ear scanner non-transitory computer readable media (29), which can, but need not necessarily, contain the application program (10).

2D Ear Scanner. With further reference to FIG. 1, in particular embodiments, the ear scanner (11) can obtain a digitized ear image (27) of the outer ear (15). As illustrative examples, the digitized ear image (27) can be acquired by operation of a digital camera (30) of any one or a combination of mobile devices (3A) such as: digital cameras, a web camera, a cellular phone, a slate, tablet or pad computer, iPods®, iTouch®, smart watch, or the like. The application program (10) can include an ear measurement module (10A) which can function to analyze pixel data (31) of the acquired digitized ear image (27) by comparison of acquired pixel to pixel distances (32A) against known pixel to pixel distances (32B) associated with one or more pixel distance calibration object(s) (32C) (also referred to as the "calibration object (32C)"). In particular embodiments, the calibration object (32C) can be any object of known dimension imaged with the ear (12), while in other embodiments, the calibration object (32C) can be one or a plurality of digitized ear calibration images (32D) having known measures associated with known pixel to pixel distances (32B) within each digitized calibration ear image (32D). The acquired digitized ear image (27) can be compared, or scaled and compared, against the digitized calibration ear images (32D) have the closest dimensional relationships to or between one or a plurality of anatomical features (33) of the digitized ear image (27) such as the periphery of the auricle or pinna (33A), the antihelix (33B), the tragus (33C), antitragus (33D), and concha (33E) or the external ear canal opening (33F). In particular embodiments, a digital ear image (27) of only one ear (12) can suffice to generate the ear scan data (13) sufficient to generate an outer ear data model (14) for both ears (12) of the same wearer.

3D Ear Scanner. With further reference to FIG. 1, in particular embodiments, the ear scanner (11) can generate ear scan data (13) and further provide an outer ear data model (14) which provides a virtual reconstruction of the ear canal (33G) from distance offset data (34). In particular embodiments, the ear scanner (11) can use optical coherence tomography (OCT). OCT performs high-resolution, cross-sectional tomographic imaging of the outer ear (15) by measuring backscattered or back reflected light. An OCT scanner (11A) can be used to collect a series of cross-sectional images, to compound these 2D images into a 3D volume as described in US Patent Publication US2006/0276709, hereby incorporated by reference in the entirety herein. However, this illustrative example is not intended to preclude embodiments which generate ear scan data by different methodology. As illustrative examples, ear scanners (11) suitable for use in embodiments of the invention can be an Otoscan 3D Ear Scanner available from Natus Medical Inc., 50 Commerce Drive, Unit 180, Schaumburg, Ill. 60173 or EinScan Pro 2X Plus available from Shining 3D Tech. Co., Ltd., Hangzhou, China.

3D Ear Scanner Inflatable. Again, referring primarily to FIG. 1, in particular embodiments, the ear scanner (11) can obtain a digitized ear image (27) of the outer ear (15) by inflating an inflatable membrane (34). The inflated inflatable membrane (34) can conform an inflatable membrane exterior surface (35A) to the of the ear canal interior surface (36) of the ear (12). Light (37) from a light emitter (38) can illuminate the inflatable membrane interior surface (35B). The inflatable member (34) may include a fluorescent material (39) excited by one or more wavelengths of light (37) emitted by the light emitter (38). The fluorescent material (39) excited by the emitted light (37) may emit fluorescent light (40) at two or more wavelengths or a range of wavelengths. A detector (41) can detect emitted fluorescent light (40) from the fluorescent material (39) of the inflatable membrane interior surface (35B). The emitted fluorescent light (40) can have a first optical wavelength and a second optical wavelength. The ratio of the intensities of light $\lambda_1, \lambda_2$ or the ratio of the integral area of light found under specific ranges may be measured and recorded by ear scanner (11) or ear scanner processor (28) or server processor (8) to determine a distance from the ear scanner (11) to corresponding surface of the inflatable membrane (34). The ear scanner processor (28) or server processor (8) can generate an outer ear data model (14) of the of the ear canal interior surface (36).

3D Earpiece Printing. Now referring primarily to FIG. 1, in particular embodiments, based on the three-dimensional earpiece data model (16) the application program (10) can further function to generate a three-dimensional earpiece buildup application (17) to operate a three-dimensional materials deposition apparatus (18) in an additive buildup process (17A) to buildup the three-dimensional earpiece (19) contoured to conformably engage the outer ear (15).

The term "outer ear" for the purposes of this invention means the pinna, or auricle (the visible projecting portion of the ear), the external acoustic meatus including the outside opening to the external ear canal and the ear canal extending to the tympanic membrane (also referred to as the eardrum).

The term "auricle" also referred to as the pinna, for the purposes of this invention means the visible part of the ear that resides outside the head.

The term "ear canal" for the purposes of this invention means the canal extending from the outside opening of the auricle of the ear to the tympanic membrane.

The term "additive buildup process" for the purposes of this invention means any process of layering materials to produce a three-dimensional object, and without limiting the breadth of the forgoing, particular embodiments of the additive buildup process (17A) can but need not necessarily include three-dimensional printing ("3D printing") in which the three-dimensional earpiece (19)(19') can be created from the three-dimensional earpiece data model (16) using a materials deposition apparatus (18) laying down successive layers of a build material (42) which can, but need not necessarily, be a filament (42A) or granulated or powder build material (42B) and a binder liquid (42C).

The term "earpiece" for the purposes of this invention means a three-dimensional object conformed or conformable to a part of the outer ear (15) including any portion of the auricle (33A) or ear canal (33G) or both.

Again, referring primarily to FIG. 1, particular embodiments can include a three-dimensional materials deposition apparatus (18) including a materials deposition apparatus controller (18A) having a controller processor (18B) communicatively coupled to a controller non-transitory computer readable medium (18C) containing the three-dimensional earpiece buildup application (17) and adapted to receive and contain the three-dimensional earpiece data model (16). The three-dimensional earpiece data model (16) can be stored in industry-standard file formats as digital model files, which can be transmitted electronically and interpreted by the three-dimensional earpiece buildup application (17) to provide computer program instructions executable to implement functions necessary to control the three-dimensional materials deposition apparatus (18) and additive buildup process (17A) to produce the three-dimensional earpiece (19). The materials deposition apparatus controller (18A) can take the form of a general-purpose computer, special purpose computer or other programmable data processing apparatus, including, but not limited to, the client computing device (3).

Again, referring primarily to FIG. 1, as to particular embodiments of the invention, the materials deposition apparatus controller (18A) can run the three-dimensional earpiece buildup application (17) which analyzes the three-dimensional earpiece data model (16), accepts parameter and preference input from the user (43), performs a series of detailed calculations and transmits to the three-dimensional materials deposition apparatus (18) (an example of a three-dimensional printer suitable in embodiments of the invention can be a Wanho I 3v2 3D Printer available from Wanho Precision Casting Co., Ltd., No. 77, West Renming Road, Jinhua, Zhejiang, China, or a three-dimensional printer assembly as described in U.S. Pat. No. 7,037,382, hereby incorporated by reference herein, or similar apparatus) commands and provides information needed to buildup or produce embodiments of the three-dimensional earpiece (19).

In particular, the three-dimensional earpiece buildup application (17) may allow the user (43) to arrange one or more three-dimensional earpiece data models (16) in a virtual volume representing the actual fabrication space within the three-dimensional materials deposition apparatus (18). The three-dimensional object production application (10) can then slice the array of digital models (16) into a plurality of layers, each of a predetermined thickness, which are transmitted to the controller (18A) housed within the three-dimensional materials deposition apparatus (18).

Particular embodiments of the three-dimensional materials deposition apparatus (18) can, perform the additive buildup process (17A) to build the three-dimensional earpiece (19) from the three-dimensional earpiece data model (16) using one or more additive manufacturing techniques such as layer-by-layer extrusion of a flowable buildup material (42). Movement of an extrusion head (44) with respect to the substrate can be performed under computer control of the three-dimensional earpiece buildup application (17) based on analysis of the three-dimensional earpiece data model (16), that represents the three-dimensional earpiece (19). In particular three-dimensional materials deposition apparatus (18), the build material (42) can be extruded through an extrusion tip (45) carried by an extrusion head (44), a portion of the extrusion head (44) heats a filament build material (42A) then deposited on a build substrate (46) in an x-y plane. The extruded build material (42) fuses to previously deposited build material (42), and solidifies upon a drop in temperature. The position of the extrusion head (44) or other components relative to the substrate can be incremented along a z-axis (perpendicular to the x-y plane), and the process repeated forms the three-dimensional earpiece (19) resembling the three-dimensional earpiece data model (16).

Build Materials. Again, referring primarily to FIG. 1, a wide variety of build materials (42) can be used in the additive buildup process (17A) and by way of example and without limitation to breadth of the foregoing, strands of filament (42A) of about one millimeter to about three millimeters in diameter can unwind from a coil or spool including as illustrative examples: thermoplastic urethane ("TPU") over a wide range of Shore Durometers in the Shore 00 range of about 30 to about 100, in the Shore A range of about 0 to about 100, and in the Shore D range of about 0 to about 60, comprising, consisting essentially of, or consisting of: TPU associated with the marks AVALON®, KRYSTALGRAN®, IROSTIC®, IROGRAN®, POLYMAKAKER POLYFLEX®, ESSENTIUM® TPU, MAKESHAPER® TPU, DIABASE X60®; and polycaprolactone (PCL); ethylvinylacetate (EVA); and polylactic acid (PLA); and FORM LABS® Elastic Resin 1L, and combinations thereof. The build materials (42) can further include any one or more of admixed agents (47) such as starch to impart greater biodegradability; colorants, such as alcohol dyes or acrylic coloring agents; powders such as acrylic powder; particulates of plastic, copolymer plastics, metal, bismuth oxychloride, glitter; or the like, either separately or in various combinations.

In particular embodiments, the build material (42) of the three-dimensional earpiece (19) can be pre-selected (FIG. 25, Block 80) to afford a three-dimension earpiece (19) which can have a fixed or substantially fixed configuration (48) after buildup (FIG. 25, Block 81). A desired amount of elasticity, compressibility, or Shore Durometer (or combinations thereof) can be achieved by pre-selection of the build material (42) to afford a desired conformability and wearing comfort upon engaging the outer ear (15). In this regard the build material (42) can comprise, consist essentially of, or consist of: generic TPU, or one or more of the TPUs associated with the marks above enumerated, or combinations thereof.

Figure 23:
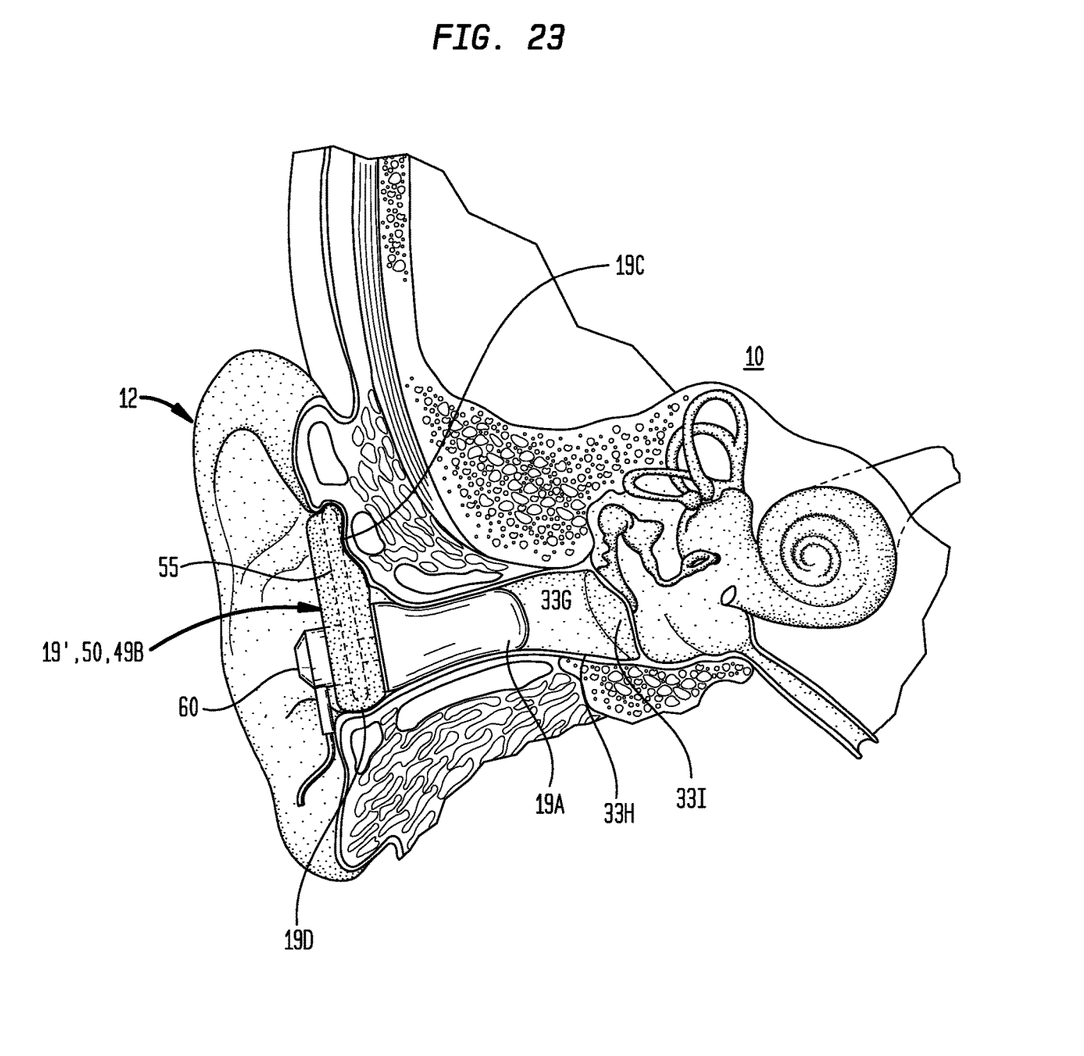
FIG. 23 illustrates a cross section of the ear and a method of molding an embodiment of the earpiece produced in the system of FIG. 1 to conform to the anatomy of the outer ear.
Figure 24:
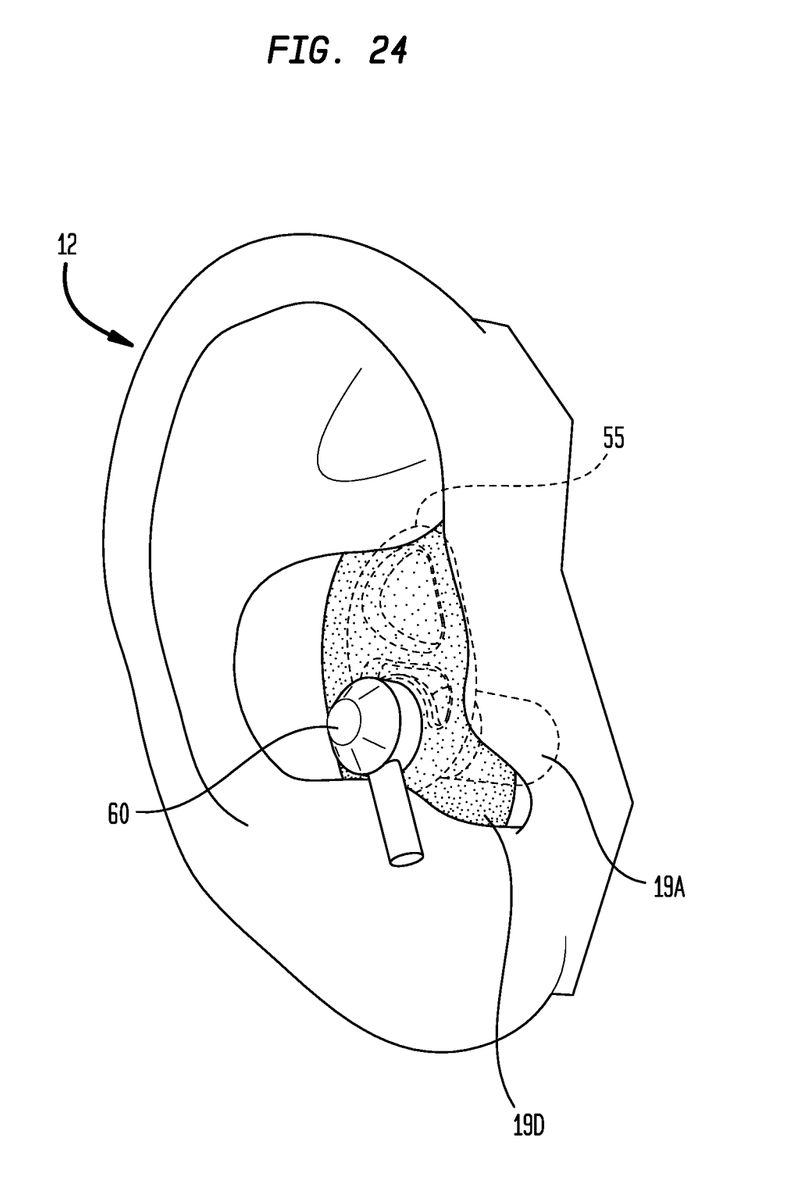
FIG. 24 is a perspective view of the earpiece produced in the system of FIG. 1 inserted and conformed to a part of the outer ear.

In particular embodiments, the build material (42) can be pre-selected to afford a three-dimensional earpiece (19) which can have a first fixed configuration (49A) after buildup and upon heating can be moldably engaged with the outer ear (15) (or parts thereof) to cool to a second fixed configuration (49B) which conforms or substantially conforms with the engaged outer ear (15) (or parts thereof)(FIG. 25, Block 88). The three-dimensional earpiece (19) can be heated or repeatedly re-heated (FIG. 25, Block 74), engaged with the outer ear (15)(as shown in the example of FIG. 23)(FIG. 25, Block 75), and cooled to obtain a desired second fixed configuration (49B) (FIG. 25, Block 76) of the three-dimensional earpiece (19). Accordingly, the second fixed configuration (49B) can be substantially the same or different from the first fixed configuration (49A). A desired amount of elasticity, compressibility, or Shore Durometer in the first or the second fixed configuration (49A)(49B) can be obtained by pre-selection of the build material (42)(FIG. 25, Block 89) to afford a desired conformability and wearing comfort upon engaging the outer ear (15). In regard to these embodiments of the three-dimensional earpiece (19), a suitable build material can comprise, consist essentially of or consist of: polycaprolactone (PCL), ethylvinylacetate (EVA), polylactic acid (PLA), FORM LABS® Elastic Resin 1L, and combinations thereof.

In particular embodiments, the build material (42) of the three-dimensional earpiece (19) can be pre-selected to afford particular elements of the three-dimension earpiece (19) which can have only one fixed configuration (48) after buildup, and can be further pre-selected to afford other particular elements of the three-dimensional earpiece (19) which can have a first fixed configuration (49A) upon buildup and can be heated to achieve a moldable condition (50) which can be engaged with the outer ear (15) and allowed to cool to achieve a second fixed configuration (49B) conformed to the outer ear (15). A desired amount of elasticity, compressibility, or Shore Durometer (or combinations thereof) can be achieved for the various elements of the three-dimensional earpiece (19) by pre-selection of the build material (42) to afford a desired conformability and wearing comfort upon engaging the outer ear (15)(FIG. 25, Block 77). In this regard the build material (42) can comprise, consist essentially of, or consist of: generic TPU, or one or more of the TPUs associated with the marks above enumerated, or combinations thereof which do not form the moldable condition upon heating, and can comprise, consist essentially of, or consist of: polycaprolactone (PCL), ethylvinylacetate (EVA), polylactic acid (PLA), FORM LABS® Elastic Resin 1L, and combinations thereof, which form the moldable condition upon heating.

The above illustrative examples of build materials (42) useful in an additive buildup process (17A) of embodiments of the three-dimensional earpiece (19) are not intended to preclude the use of other build materials (42) such as powdered build materials (42B) used with liquid binder materials (42C) or the use of other types or kinds of three-dimensional materials deposition apparatus (18).

The Three-Dimensional Earpiece. Generally, referring to FIGS. 2 through 23, a wide variety of three-dimensional earpieces (19) can be obtained in embodiments of the system (1), or by implementing the three-dimensional earpiece production application (10) directly on a client computer (3) or with an associated ear scanner (11) to generate ear scan data (13) or an outer ear data model (15) of the outer ear (15), or access existing ear scan data (13) or outer ear data model (16), which can be analyzed by the application program (10) to generate a three-dimensional earpiece data model (16) which can be processed by the a three-dimensional earpiece buildup application (17) to control a material deposition apparatus (18) to buildup any one or more of the embodiments of the three-dimensional earpiece (19) in the entirety, or in certain embodiments including a kit (51), those tangible elements of the three dimensional earpiece (19) that are not provided with the kit (51).

Now referring primarily to FIGS. 2 through 8, in particular embodiments, the three-dimensional earpiece (19) can comprise, consist essentially of, or consist of only an ear canal earpiece (19A) contoured to removably insert into the ear canal (33G) and engage or conformably engage the ear canal walls (33H).

Again, referring primarily to FIGS. 2 through 8, in particular embodiments, the three-dimensional earpiece (19) can comprise, consist essentially of, or consist of only an auricle earpiece (19B) contoured to removably insert into or conformably engage an auricle (33A) of said the ear (12).

Again, referring primarily to FIGS. 2 through 8, in particular embodiments, the three-dimensional earpiece (19) can comprise, consist essentially of, or consist of only an outer ear earpiece (19C) contoured to removably insert into or conformably engage both the auricle (19B) and the ear canal walls (33H) of the ear canal (33G) of the ear (12).

Now referring primarily to FIGS. 9 through 15, in particular embodiments, the three-dimensional earpiece can, but need not necessarily, further include a passage (52) open between a first location (52A) and a second location (52B) of the three-dimensional earpiece external surface (19D). In particular embodiments, the passage (52) can be configured to retain or removably retain an in-ear device (60)(FIG. 25, Block 78) proximate the first location (52A) and open at the second location (52B) to allow sound (54) to be transmitted into the ear canal (33G) to the tympanic membrane (331). The term "in-ear device" for the purpose of this invention means any device that can be associated with or inserted in the auricle (33A) or ear canal (33G), and without limitation in the breadth of the foregoing includes as illustrative examples, whether wired or wireless, or whether WIFI® or BLUETOOTH® enabled: earphones, ear speakers, earbuds, hearing aids, headsets, medical devices.

Again, referring primarily to FIGS. 9 through 15, in particular embodiments, the three-dimensional earpiece (19) can, but need not necessarily, further include a conduit (53) disposed in a passage (52) open between the first location (52A) and the second location (52B) on the three-dimensional earpiece external surface (19D). The conduit (53) can have a conduit external surface (53A) which engages the three-dimensional earpiece (19) and a conduit internal surface (53B) configured to releasably retain an in-ear device (60).

Now, referring to FIGS. 2 through 23, in particular embodiments, the three-dimensional earpiece (19)(19') can in whole or in part which upon heating achieves a moldable condition (50) (also referred to as a "moldable earpiece (19')") which allows reconfiguration of the three-dimensional earpiece external surface (19D) from a first fixed configuration (49A) and which upon cooling maintains a second fixed configuration (49B). A first fixed configuration (49A) of the three-dimensional earpiece (19) can be sufficiently heated to allow the three-dimensional earpiece external surface (19D) to be reconfigured in a mold or by engagement with the outer ear (15) (as shown in the example of FIG. 23). The moldable condition (50) can be molded into the form of the mold or the engaged portion of the outer ear (15) (whether of the auricle (33A) only, or of the ear canal (33G) only, or a combination of the auricle (33A and the ear canal (33G).

The term "fixed configuration" for the purposes of this invention means a substantially rigid form or a resiliently elastic form capable recovering size or shape after deformation.

The term "moldable condition" for the purposes of this invention means a substantially inelastic deformable condition which retains the form of the mold or portion of the outer ear upon engagement.

The term "moldable earpiece (19')" for the purpose of this invention means a three-dimensional earpiece (19), which in whole or in part, retains a first fixed configuration (49A) at temperatures below about 40° C. (110° F.) and can be molded in a temperature range of about 40° C. (about 110° F.) to about 65° C. (150° F.) and then cures at room temperature to retain a second fixed configuration (49B). As an illustrative example, the build material (42) can comprise, consist essentially of or consist of polycaprolactone (CAS No.: 24989-41-4) which can be heated above 40° C. to about 65° C. (150° F.) to produce the moldable condition (50) of the moldable earpiece (19'). The moldable earpiece (19') upon being engaged with a mold or the outer ear (15) can be cooled to room temperature to maintain a second fixed configuration (49B) imparted by the mold or the engaged part of the outer ear (15).

Now, referring primarily to FIGS. 16 through 22, in particular embodiments, the three-dimensional earpiece production application (10) can further include computer executable instructions to control the additive buildup process (17A) to buildup an intra-auricular support (55) removably positionable in an auricle (33A) of an ear (12). The intra-auricular support (55) can have an intra-auricular support outer surface (55A) opposite an intra-auricular support inner surface (55B), where each surface extends to an intra-auricular support peripheral edge (55C). In particular embodiments, the intra-auricular support (55) can be positioned within the area of the auricle (33A) of the ear (12) anatomically defined by the antihelix (33B), tragus (33C), antitragus (33D), and concha (33E) (also referred to as the concha bowl), and concurrently defining an opposite an intra-auricular support inner surface (55B) of sufficient area which precludes ingress of the external ear canal opening (33F).

In particular embodiments, the intra-auricular support (55) can, but need not necessarily, further include or consist of an ear canal earpiece (19A) contoured to conformably engage the ear canal (33G) of the ear (12) upon positioning the intra-auricular support (55) in the ear (12). The intra-auricular support (55) can, but need not necessarily include or consist of an auricular earpiece (19B) contoured to engage the auricle (33A) of the ear (12) and an ear canal earpiece (19A) contoured to engage an ear canal (33G) of the ear (12) upon positioning the intra-auricular support (55) in the ear (12). In particular embodiments, the intra-auricular support (55) can, but need not necessarily, further include or consist of an intra-auricular support conduit (55D) outwardly extending from said intra-auricular support (55). The intra-auricular support conduit (55D) can have an intra-auricular support conduit external surface (55E) engaged by the auricular earpiece (19B) further built during buildup by the additive buildup process (17A), and have an intra-auricular support conduit internal surface (55F) defining an intra-auricular support passage (56) open at opposite intra-auricular support conduit ends (55G)(55H). The intra-auricular support conduit internal surface (55F) can be configured to removably retain an in-ear device (60). In particular embodiments, embodiments of the intra-auricular support (55) can be built up from a substantially rigid inelastic build material (42) which does not achieve the moldable condition (50), while the auricular earpiece (19B) or the ear canal earpiece (19A) can be built up from a build material (42) which can achieve the moldable condition (50). In these particular embodiments, the moldable three-dimensional earpiece (19') can be heated to achieve the moldable condition (50) of the auricular earpiece (19B) or the ear canal earpiece (19A) while the intra-auricular support (55) positionable in the auricle (33A) of the ear (12) or the intra-auricular support conduit (55D) configured to removably retain an in-ear device (60) can remain in a substantially rigid condition which does not, or does not substantially deform. The intra-auricular support (55) can be positioned in the auricle (33A) of the ear (12), to correspondingly position the portions of the moldable three-dimensional earpiece (19') in the moldable condition (50) allowing each to conformably engage the outer ear (15), auricle (33A), or ear canal (33G) or combinations thereof. The moldable three-dimensional earpiece (19') upon cooling assumes a substantially second fixed condition (49B) conformed to the corresponding portions of the outer ear (15).

Now, referring primarily to FIGS. 1 and 23, in particular embodiments, the moldable condition (50) can be achieved by locating the moldable three-dimensional earpiece (19') in a heated enclosure (57). The moldable earpiece (19') can be heated within the heated enclosure (57) having a temperature maintained at about 70° C. (160° F.) for about 10 minutes. The moldable earpiece (19') can be removed from the heated enclosure (57) and allowed to sufficiently cool to be engaged with the outer ear (15) (typically about 30 seconds).

Again, referring primarily to FIGS. 1 and 23, in particular embodiments, the moldable earpiece (19') can be located in an amount of liquid (58). The amount of liquid (58) can be an amount of water; although the invention is not so limited, and the amount of liquid (58) can be an amount of oil, or the like. The amount of liquid (58) can be sufficiently heated to allow the moldable earpiece (19') to be heated to a temperature of about 60° C. (140° F.) for about 5 minutes.

The moldable earpiece (19') can be removed from the heated liquid (58) and allowed to sufficiently cool to be engaged with the outer ear (15) (typically about 30 seconds).

Again, referring primarily to FIGS. 1 and 23, in particular embodiments, the moldable earpiece (19') can be located in a flow of heated fluid (59). The flow of heated fluid (59) can be a flow of heated air; although the invention is not so limited. A flow of sufficiently heated fluid (59) can be obtained from a conventional hair dryer (63). The settings of the hair dryer (60), as to temperature and flow rate, can be adjusted to allow the moldable earpiece (19') to be sufficiently heated within a period of about one minute to about 2 minutes. The moldable earpiece (19') can be removed from the flow of heated fluid (59) and allowed to sufficiently cool to be engaged with the outer ear (15) (typically about 30 seconds).

Now, referring primarily to FIGS. 9 through 15, in particular embodiments, the in-ear device (60) can be inserted into the passage (52) of the moldable earpiece (19'). The moldable earpiece (19') in the moldable condition (50) in contact with the in-ear device (60) can be molded about the in-ear device (60) to make the in-ear device (60) generally one piece with the moldable earpiece (19').

The moldable earpiece (19') conformably engaged to the outer ear (15) can be allowed to cool while engaged with the outer ear (15) for a period of about five minutes to about ten minutes. This allows the moldable earpiece (19') to cure in a second fixed configuration (49B) which conforms to the outer ear (15). The moldable earpiece (19') conformably molded to the outer ear (15) can then be removed from the out ear (15). The moldable earpiece (19') conformed to the outer ear (15) in the cured rigid condition can be re-inserted into the outer ear (15) and removed from the outer ear (15)(FIG. 25, Block 79) as desired.

The Kit To Produce A Three-Dimensional Earpiece. Now, referring primarily to FIG. 1, particular embodiments comprise or consist of a kit (51) to produce a three-dimensional earpiece (19)(or three-dimensional moldable earpiece (19') contoured to conformably engage the outer ear (15) by operation of a three-dimensional materials deposition apparatus (18) using an additive buildup process (17A) based upon a three-dimensional earpiece data model (16) of the outer ear (15). Embodiments of the kit (51) can, but need not necessarily, include a kit non-transitory computer readable media (61) containing the three-dimensional earpiece production application code (10). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments. In particular embodiments, the kit (51) can provide a kit non-transitory computer readable media (60) other media including instructions to access a server (2) over the network (4) to obtain access to the functionalities of three-dimensional earpiece production application code (10). In either event, the application program (10) can include a graphical user interface module (10B) executable to provide a graphical user interface (23) or other user interface which by user input (25) allows pairing (whether wired or wireless pairing) of the client computer (3) with an ear scanner (11) capable of scanning a user's outer ear (15) and a material deposition apparatus (18) operable to buildup the three-dimensional earpiece (19) (19'). In particular embodiments, the ear scanner (11) and the material deposition apparatus (18) may be located at the same or at locations discrete from one another.

In particular embodiments, the application program (10) can further executed to perform one or more of: generating or obtaining an outer ear data model (14) of an outer ear (15) based upon the ear scan data (13) generated by the use of the ear scanner (11), analyze the outer ear data model (16) of an outer ear (15), and generate a three-dimensional earpiece data model (16) based on said outer ear data model (14). The user (43) by interaction with a three-dimensional earpiece configuration selection element (62) in the graphical user interface (23) to activate a three-dimensional earpiece configuration module (10C) the user (43) can select earpiece features to create a wide variety of different a three-dimensional earpieces (19) including or consisting of only an ear canal earpiece (19A) contoured to conformably engage an ear canal (33G) of the ear (12), only an auricle earpiece (19B) contoured to conformably engage an auricle (33A) of the ear (12), or an outer ear earpiece (19C) contoured to conformably engage the auricle (33A) and the ear canal (33G) of the ear (12). In particular embodiments, the user (43) by user input (25) in the graphical user interface (23) can select whether the auricle earpiece (19B) or the ear canal earpiece (19A) remain substantially fixed in configuration or whether the auricle earpiece (19B) or the ear canal earpiece (19A) can be heated to achieve the moldable condition (50). In particular embodiments, the user (43) by user input (25) in the graphical user interface (23) can select a passage (52)(FIG. 25, Block 82) open between a first location (52A) and a second location (52B) on the three-dimensional earpiece external surface (19D), wherein the passage (52) has a configuration to retain an in-ear device (60). In particular embodiments, the user (43) can pre-select one or more of the in-ear device (60)(FIG. 25, Block 83) the in-ear device manufacturer (FIG. 25, Block 84) or the in-ear device model number (FIG. 25, Block 85), to select a passage (52) for configuration specific to the selected in-ear device (60).

In particular embodiments, the kit (51) can further include a conduit (53) disposable in the passage (52), wherein the conduit (53) has a conduit external surface (53A) which engages the three-dimensional earpiece (19)(19') and a conduit internal surface (53B) configured to releasably retain the in-ear device (60). In particular embodiments, the user (43) by user input (25) with the three-dimensional earpiece configuration selection element (62) in the graphical user interface (23) can pre-select inclusion of a conduit (53)(FIG. 25, Block 86) and further select the in-ear device manufacturer and model number and the material deposition apparatus (18) can operate to buildup the conduit (53) and buildup the ear canal earpiece (19A) or auricle earpiece (19B) having the passage (52), or both, about the conduit (53).

In particular embodiments, the kit (51) can further include an intra-auricular support (55) removably positionable in the auricle (33A) of the user's ear (12). In particular embodiments, the user (43) can interact with the three-dimensional earpiece configuration selection element (62) in the graphical user interface (25) to pre-select an intra-auricular support (55)(FIG. 25, Block 87) and the material deposition apparatus (18) can operate to buildup the intra-auricular support (55). In either event, the material deposition apparatus (18) can operate to buildup the ear canal earpiece (19A) or the auricle earpiece (19B) about an intra-auricular support (55). In particular embodiments, the kit (51) can further comprise an ear canal earpiece (19A) coupled to the intra-auricular support (55), wherein the ear canal earpiece (19A) engages an ear canal wall (33H) of the outer ear (15) upon positioning an intra-auricular support (55) in the ear (12). In particular embodiments, the kit (51) can include, or the application program (10) can be activated to instruct, the material deposition apparatus (18) to buildup an intra-auricular support conduit (55D) outwardly extending from the intra-auricular support (55), wherein the intra-auricular support conduit (55D) can have an intra-auricular support conduit external surface (55E) engaged by the auricular earpiece (19B), and have an intra-auricular support conduit internal surface (55F) defining a passage (52) open at opposite conduit ends (55G)(55H) to removably retain an in-ear device (60).

In particular embodiments, the application program (10) can generate the three-dimensional earpiece data model (16) based on the outer ear data model (14) or ear scan data (13)

in coordination with interactive user input (24) of one or more of: the type of three-dimensional earpiece (19) (whether an auricular earpiece (19B), an ear canal earpiece (19A), or both), whether or not including a passage (52), whether the passage (52) has a configuration to retain an in-ear device (60) (including specific dimensional relations based on a specific manufacturer and model number of an in-ear device), an existing conduit (53) to dispose in the passage (52) or buildup in the passage (52), an existing intra-auricular support (55) positionable in the auricle (33A) of the user's ear (12) or buildup an intra-auricular support (55) positionable in the auricle (33A) of the user's ear (12), the portions of the three-dimensional earpiece (19) which remain in a fixed configuration and the portions of the three-dimensional earpiece (19) which can be heated to a moldable condition (50) for reconfiguration from a first fixed configuration (49A) and cooled to a second fixed condition (49B).

In particular embodiments, the application program (10) can be executed to generate a three-dimensional earpiece buildup application (17) executable to operate a material deposition apparatus (18) to build the three-dimensional earpiece (19)(19') based upon said three-dimensional earpiece data model (16).

Again, referring primarily to FIG. 1, in particular embodiments, the kit (51) can further include one or more build materials which can be fed by the material deposition apparatus to buildup the three-dimensional earpiece based upon said three-dimensional earpiece data model (16).

Again, referring primarily to FIG. 1, in particular embodiments, the kit (51) can further include an ear scanner (11) capable of scanning the outer ear (15).

Again, referring primarily to FIG. 1, in particular embodiments, the kit (51) can further include the material deposition apparatus.

As can be easily understood from the foregoing, the basic concepts of the present invention may be embodied in a variety of ways. The invention involves numerous and varied embodiments of a three-dimensional earpiece production system (1) and methods for making and using such system (1) to produce one or more embodiments of a three-dimensional earpiece (19)(19') including the best mode.

As such, the particular embodiments or elements of the invention disclosed by the description or shown in the figures or tables accompanying this application are not intended to be limiting, but rather illustrative of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "ear scanner" should be understood to encompass disclosure of the act of "ear scanning"—whether explicitly discussed or not—and, conversely, were there effectively disclosure of the act of "ear scanning", such a disclosure should be understood to encompass disclosure of an "ear scanner" and even a "means for ear scanning." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in Merriam-Webster's Collegiate Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the three-dimensional earpiece production systems or three-dimensional earpieces herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A system, comprising:
an ear scanner adapted to acquire a digitized ear image of an ear;
a server communicatively coupled to a non-transitory computer readable medium containing a three-dimensional earpiece production application code executable to:
analyze pixel data of the captured digitized ear image;
compare acquired pixel to pixel distances against one or more pixel distance calibration objects;
generate an outer ear data model of an outer ear;
analyze an outer ear data model of an outer ear; and
generate three-dimensional earpiece data model based on said outer ear data model;
analyze said three-dimensional earpiece data model;
generate a three-dimensional earpiece buildup application executable to operate a material deposition apparatus to build a three-dimensional earpiece based upon said three-dimensional earpiece data model;
a client computer communicatively coupled to said server to access said three-dimensional earpiece production application code; and
a material deposition apparatus communicatively coupled to said client computer, said three-dimensional earpiece buildup application controls said material deposition apparatus to buildup said three-dimensional earpiece contoured to conformably engage said outer ear of said ear.

2. The system of claim 1, wherein said three-dimensional earpiece comprise an ear canal earpiece contoured to conformably engage an ear canal of said ear.

3. The system of claim 1, wherein said three-dimensional earpiece comprises an auricle earpiece contoured to conformably engage an auricle of said ear.

4. The system of claim 1, wherein said three-dimensional earpiece comprises outer ear earpiece contoured to conformably engage said auricle and said ear canal of said ear.

5. The system of claim 1, wherein said three-dimension earpiece further comprises a passage open between a first location and a second location on said external surface of said three-dimensional earpiece, said passage configured to retain an in-ear device.

6. The system of claim 5, wherein said three-dimensional earpiece further comprises a conduit disposed in said passage, said conduit having a conduit external surface which engages said three-dimensional earpiece and a conduit internal surface configured to releasably retain said in-ear device.

7. The system of claim 6, wherein said three-dimensional earpiece has a moldable condition which allows reconfiguration of said external surface of said three-dimensional earpiece.

8. The system of claim 7, wherein said earpiece in said moldable condition engaged with said auricle of said ear curable to dispose said external surface of said earpiece in a fixed configuration, said conduit maintaining said conduit internal surface to releasably retain said in-ear device.

9. The system of claim 8, wherein said three-dimensional earpiece has a first fixed configuration heatable to achieve said moldable condition, said earpiece in said moldable condition engaged with said auricle of said ear coolable to dispose said external surface of said three-dimensional earpiece in a second fixed configuration.

10. The system of claim 9, wherein said material deposition apparatus operates to buildup said three-dimensional earpiece with a build material selected from the group consisting of: polycaprolactone, ethylvinylacetate, polylactic acid, and combinations thereof.

11. The system of claim 1, wherein said material deposition apparatus operates to buildup said three-dimensional earpiece with a build material selected from the group consisting of: thermoplastic elastomer, thermoplastic urethane, polycaprolactone, ethylvinylacetate, polylactic acid, and combinations thereof.

12. The system of claim 1, wherein said three-dimension earpiece comprises an intra-auricular support removably positionable in an auricle of an ear.

13. The system of claim 12, wherein said intra-auricular support further comprises an ear canal earpiece contoured to conformably engage an ear canal of said ear upon positioning said an intra-auricular support in said ear.

14. The system of claim 12, wherein said intra-auricular support further comprises an auricular earpiece contoured to conformably engage an auricle of said ear upon positioning said an intra-auricular support in said ear.

15. The system of claim 12, wherein said intra-auricular support further comprises an auricular earpiece contoured to conformably engage an auricle of said ear and an ear canal earpiece contoured to conformably engage an ear canal of said ear upon positioning said an intra-auricular support in said ear.

16. The system of claim 14, wherein said intra-auricular support further comprises an intra-auricular support conduit outwardly extending from said intra-auricular support, said intra-auricular support conduit having an external surface engaged by said auricular earpiece, and have an internal surface defining a passage open at opposite conduit ends.

17. The system of claim 16, wherein said internal surface of said intra-auricular support conduit has a configuration to removably retain an in-ear device.

18. The system of claim 1, wherein said calibration object comprises a plurality of digitized calibration ear images having known pixel to pixel distances within each digitized calibration ear image.

19. The system of claim 18, wherein said three-dimensional earpiece production application code further executable to compare said acquired digitized ear image against said plurality of digitized calibration ear images.

20. The system of claim 19, wherein said three-dimensional earpiece production application code further executable to identify said plurality of digitized calibration ear images having the closest dimensional relationships to or between one or more anatomical features of said digitized ear image.

21. The system of claim 1, wherein said ear scanner comprises an inflatable membrane adapted to conform to an ear canal of said ear.

22. The system of claim 21, wherein said ear scanner further comprises:
- a light emitter disposed to illuminate said inflatable membrane interior surface;
- a fluorescent material disposed on said inflatable membrane interior surface, said fluorescent material emitting fluorescent light at one or more wavelengths;
- a detector which generates a signal which varies based on light intensity of said one or more wavelengths of said fluorescent light,
  wherein said three-dimensional earpiece production application code further executable to:
    process said signal which varies based on light intensity of said one or more wavelengths of said fluorescent light,
    measure said light intensity of said one or more wavelengths of said fluorescent light; and
    determine a distance from said ear scanner to said inflatable membrane interior surface.

23. The system of claim 1, wherein said ear scanner comprises an optical coherence tomography device operable to generate said digitized ear image of said ear.

* * * * *

UNITED STATES PATENT AND TRADEMARK OFFICE
CERTIFICATE OF CORRECTION

| | |
|---|---|
| PATENT NO. | : 11,736,848 B2 |
| APPLICATION NO. | : 17/440484 |
| DATED | : August 22, 2023 |
| INVENTOR(S) | : Kyle J Kirkpatrick |

It is certified that error appears in the above-identified patent and that said Letters Patent is hereby corrected as shown below:

In the Claims

In Column 15, Line 50 (Claim 1, Line 12) "analyze an outer ear data model of an outer ear; and" should read --analyze an outer ear data model of an outer ear;--.

Signed and Sealed this
Tenth Day of October, 2023

*Katherine Kelly Vidal*

Katherine Kelly Vidal
*Director of the United States Patent and Trademark Office*